Figure 1:
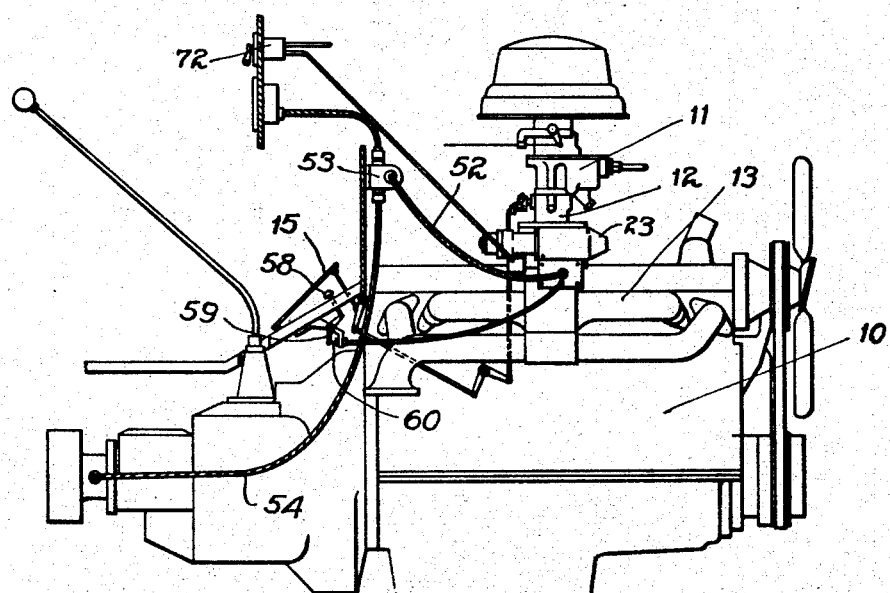

Sept. 13, 1938.  G. E. HOWARD  2,130,088

SPEED REGULATOR

Filed April 19, 1937  5 Sheets-Sheet 1

INVENTOR
George E. Howard
By Archworth Martin
Attorney

Sept. 13, 1938.     G. E. HOWARD     2,130,088
SPEED REGULATOR
Filed April 19, 1937     5 Sheets-Sheet 2
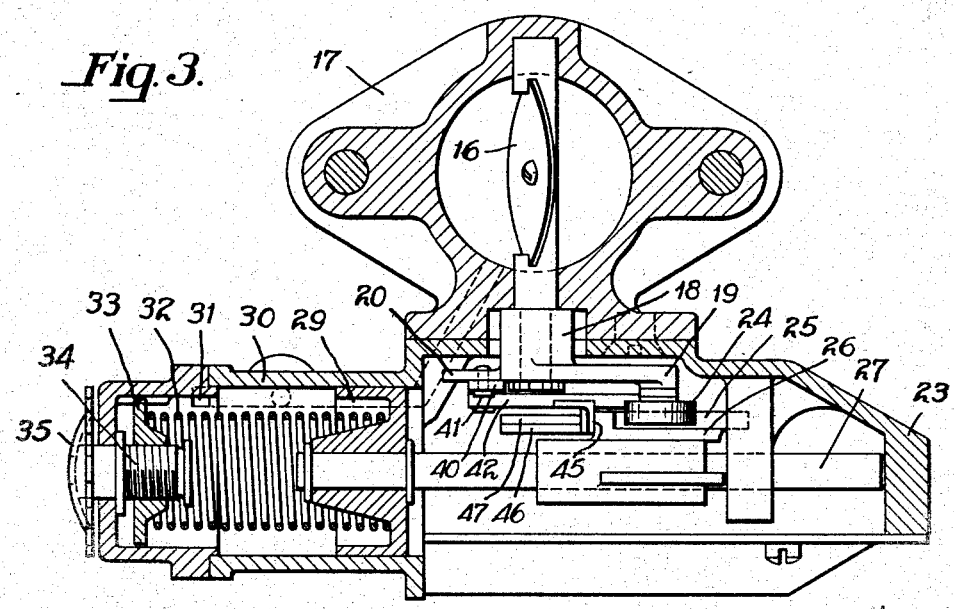
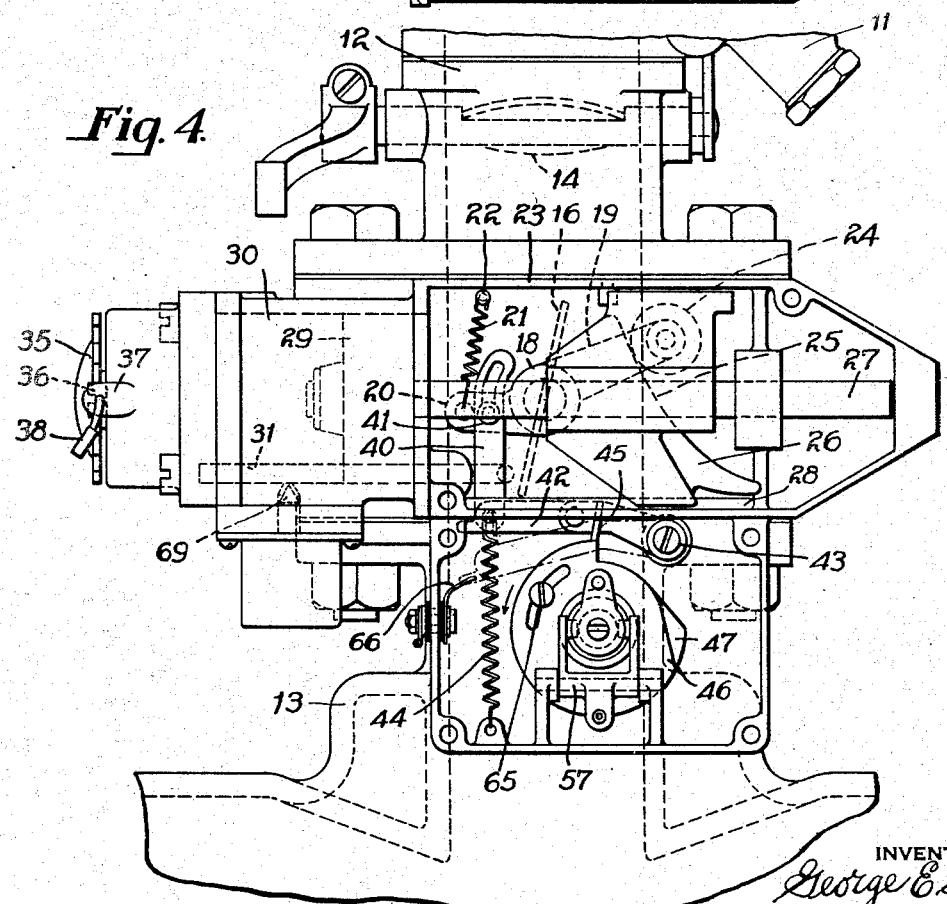
INVENTOR
George E. Howard,
By Archworth Martin
Attorney.

Sept. 13, 1938.   G. E. HOWARD   2,130,088
SPEED REGULATOR
Filed April 19, 1937   5 Sheets-Sheet 3

INVENTOR
George E. Howard,
By Archworth Martin,
Attorney.

Sept. 13, 1938.   G. E. HOWARD   2,130,088
SPEED REGULATOR
Filed April 19, 1937   5 Sheets-Sheet 4

INVENTOR
George E. Howard,
By Archworth Martin,
Attorney.

Sept. 13, 1938.　　　　G. E. HOWARD　　　　2,130,088
SPEED REGULATOR
Filed April 19, 1937　　　　5 Sheets-Sheet 5
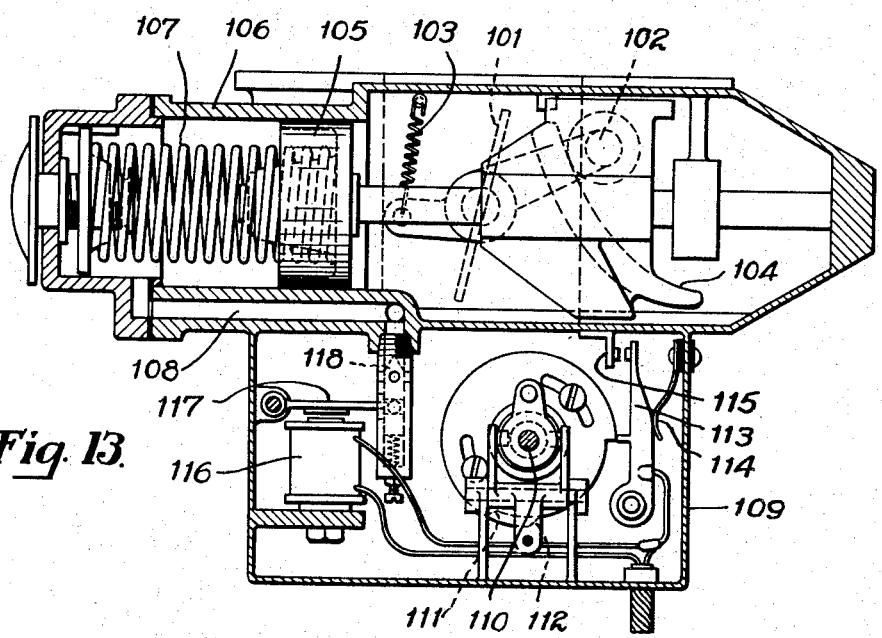
Fig. 13.
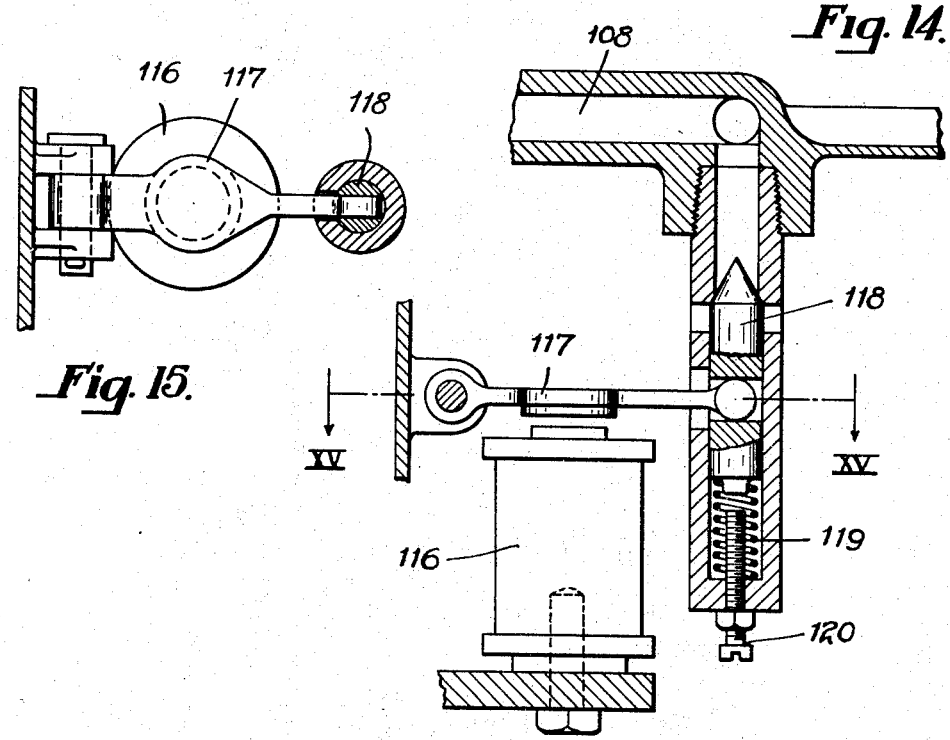
Fig. 14.
Fig. 15.
INVENTOR
George E. Howard,
By Archworth Martin
Attorney Patented Sept. 13, 1938

2,130,088

UNITED STATES PATENT OFFICE 2,130,088

SPEED REGULATOR

George E. Howard, Butler, Pa.

Application April 19, 1937, Serial No. 137,758

21 Claims. (Cl. 180—82)

My invention relates to speed regulators which are especially suited for use in connection with internal combustion engines.

Various governing devices have heretofore been employed for controlling the speed of motor vehicle motors, in order to throttle the same when a predetermined maximum speed is approached, but under certain traffic conditions such governors are dangerous in that they tend to increase accidents rather than serving their intended purpose of preventing accidents through limiting of road speeds.

One condition under which the use of speed governors of the older types is objectionable arises out of a situation when the driver of a vehicle in attempting to pass another vehicle traveling in the same direction finds it necessary to increase his speed temporarily above the limit provided for by the governing device, in order to get completely past the slower-moving vehicle before a third vehicle coming toward him becomes dangerously close. Another condition under which an extra temporary burst of speed would be required is where a driver who is proceeding at the normal maximum speed finds it necessary to quickly get out of the way of a vehicle approaching from a side road, for example.

One object of my invention is to provide a speed governing device which will normally limit driving speeds to a predetermined maximum, but wherein provision is made for permitting acceleration in excess of said normal speed for a limited period of time, or distance, and wherein after said period of time or distance the speed will be automatically reduced to said normal rate.

Another object of my invention is to provide a speed control device of the character referred to, wherein the period of acceleration is automatically followed by another period which is preferably longer than the acceleration period, during which the governor is effective to prevent the vehicle from attaining a speed greater than the normal maximum speed for which the governor is set.

Another object of my invention is to provide means whereby the relative duration of the accelerating period and the following lag period may be adjusted for different ratios of time or distance of vehicle travel.

Still another object of my invention is to provide means whereby the maximum acceleration speed, while it is higher than the maximum governor speed, can be adjustably limited so as to prevent excessive speed of the vehicle and prevent racing of the engine, especially when used with those types of governors which control engine speeds.

Another object of my invention is to provide a speed control device of the character referred to, wherein the duration of acceleration can be adjusted to various desired periods of time or distances of vehicle travel.

A further object of my invention is to provide means for automatically changing the governor control for normal speeds from one "set" governing position to another, as for example, so that it may automatically be caused to confine the vehicle speed to a lower rate at night than in daytime.

Figure 2:
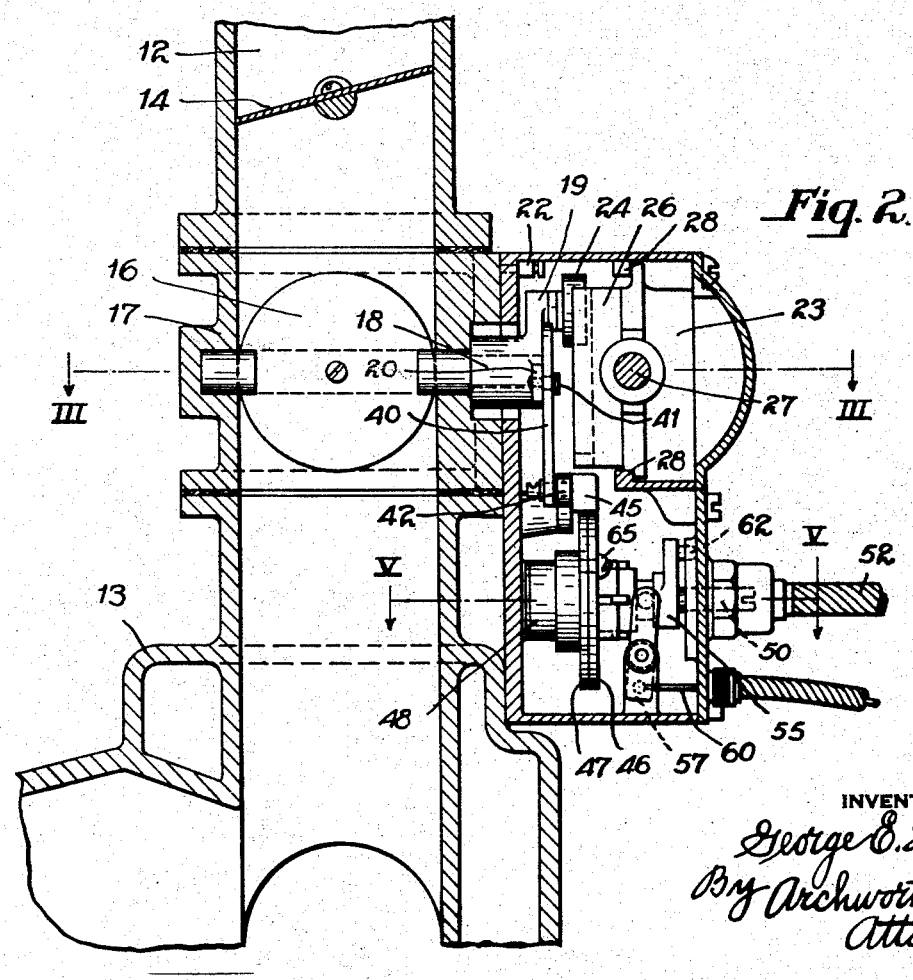
Figure 5:
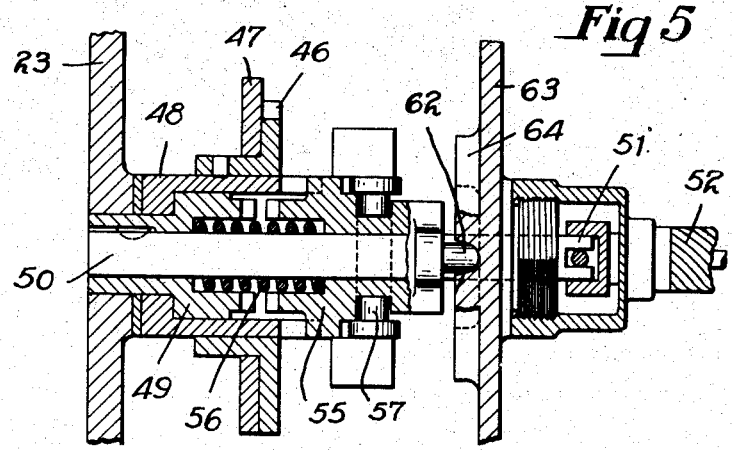
Figure 7:
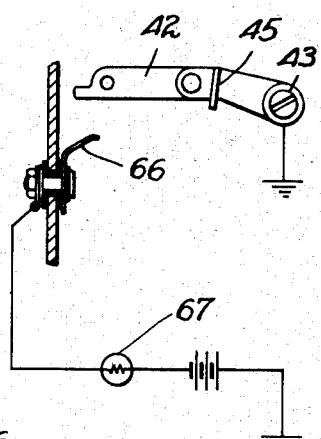
Figure 8:
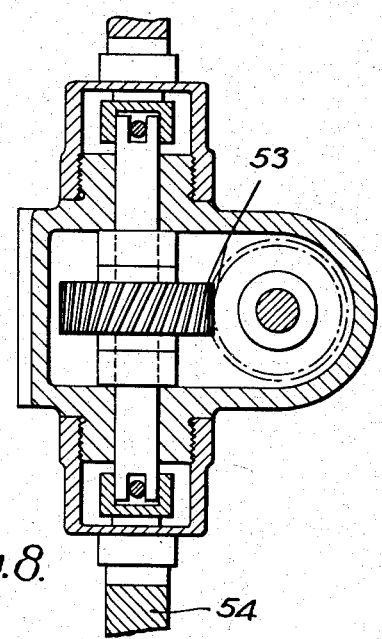
Figure 6:
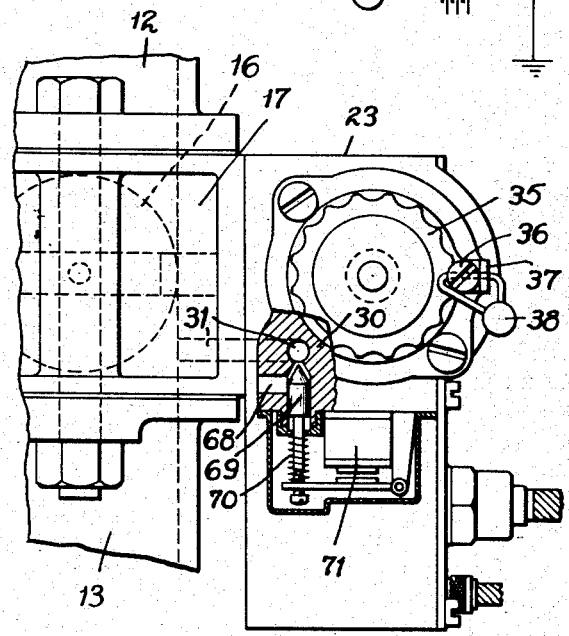
Figure 9:
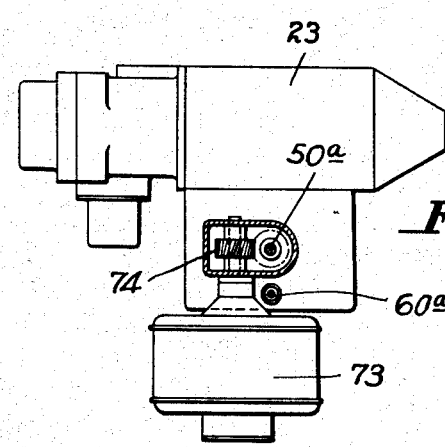
Figure 10:
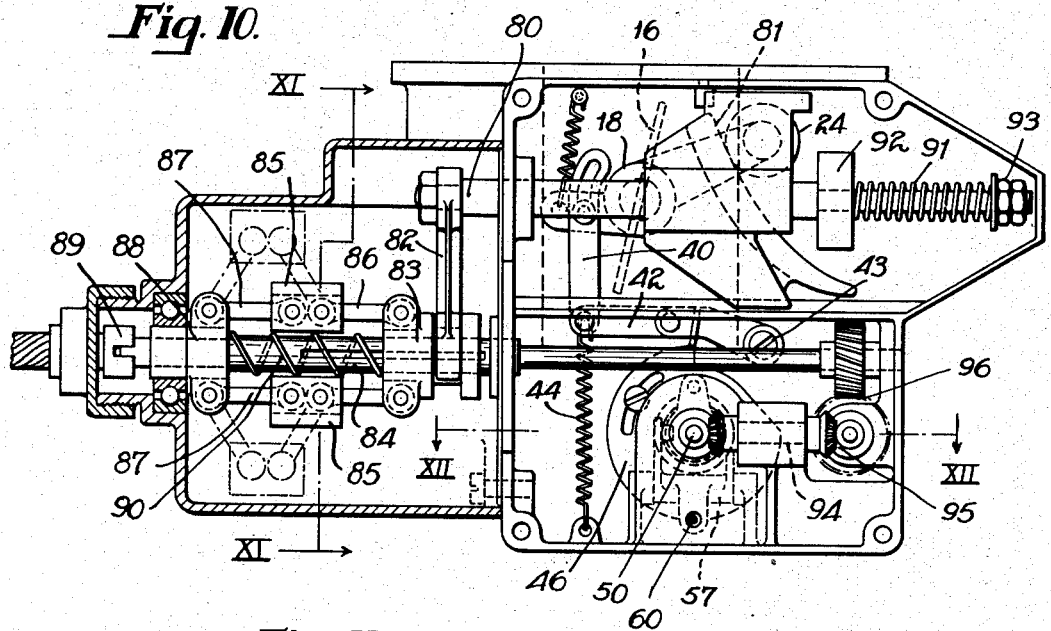
Figure 11:
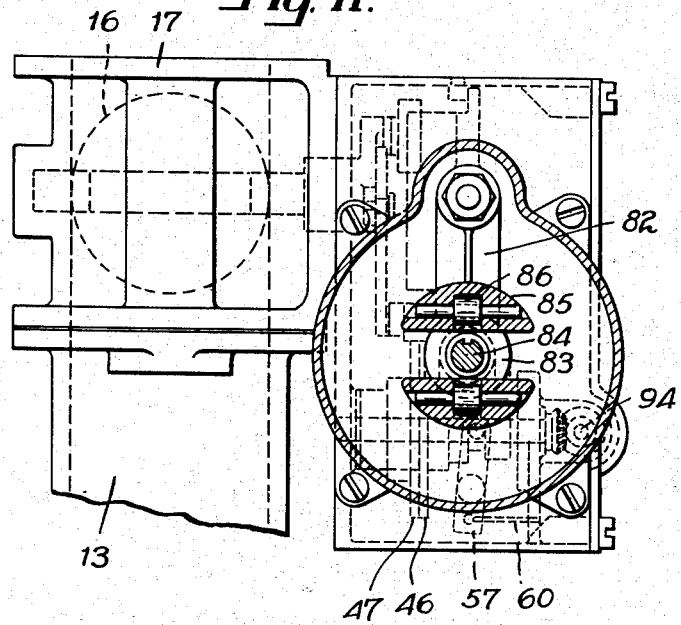
Figure 12:
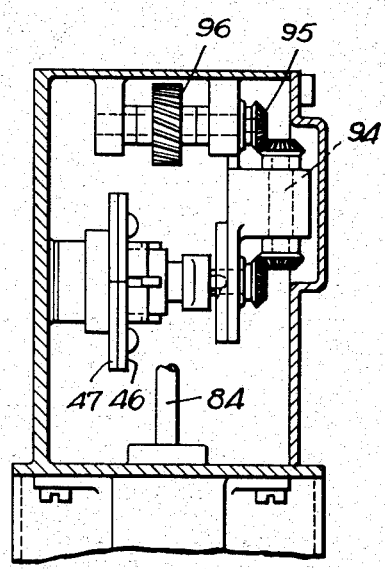

Some forms of apparatus for practicing my invention are shown in the accompanying drawings wherein Figure 1 is a side elevational view of a portion of a motor vehicle to which my invention is applied; Fig. 2 is a vertical sectional view on an enlarged scale, through a portion of the apparatus of Fig. 1; Fig. 3 is a view taken on the line III—III of Fig. 2; Fig. 4 is a front elevational view of the apparatus of Figs. 2 and 3 with the cover removed; Fig. 5 is an enlarged view taken on the line V—V of Fig. 2; Fig. 6 is a fragmentary end view of the structure of Fig. 4, partly in section; Fig. 7 is a diagrammatic view of an indicator apparatus to show the position of certain of the speed control elements at a certain stage of operation; Fig. 8 is a sectional view on an enlarged scale of certain of the transmission mechanism for certain of the regulating members; Fig. 9 shows a modified form of drive for certain of the control elements of the speed regulator; Fig. 10 is an elevational sectional view showing a modification of the apparatus shown in Figs. 3 and 4; Fig. 11 is a view taken on the line XI—XI of Fig. 10; Fig. 12 is a view taken on the line XII—XII of Fig. 10; Fig. 13 is a vertical sectional view, showing still another modification of the speed regulating apparatus of Fig. 2; Fig. 14 is a vertical sectional view, on an enlarged scale, of a portion of the structure of Fig. 13, and Fig. 15 is a view taken on the line XV—XV of Fig. 14.

As heretofore stated, I provide a governor for normally limiting vehicle speed to a predetermined maximum rate, in combination with means for temporarily rendering the governor ineffective to limit the rate of travel of the vehicle.

Referring first to the regulating apparatus shown in Figs. 1 to 8, a motor vehicle engine is indicated by the numeral 10, having the usual carburetor 11, intake pipe 12 and intake manifold 13, the intake pipe being provided with the usual throttle valve 14 which is controlled in the ordinary manner from a foot pedal 15.

A governor throttle valve 16 is mounted in a casing 17 that is inserted in the intake line between the carburetor and the intake manifold. The valve 16 is actuated by the governing mechanism, hereinafter described, in order to prevent the vehicle running at excessive speed. To this end the stem or shaft of the valve 16 is provided with an operating lever 18 having crank arm extensions 19 and 20. A spring 21 is connected to the arm 20 and to a pin 22 mounted on the wall of a casing 23, to normally bias the valve 16 to closed position.

The arm 19 is provided with a cam roller 24 which normally has engagement with cam surface 25 of a slide plate 26. The plate 26 is secured to a piston rod 27 and held against tilting by guides 28 that are formed on the inner side walls of the casing 23. As the piston rod reciprocates, the cam surface will operate against the roller 24 to effect oscillation of the valve 16. When the piston rod moves toward the right, as viewed in Fig. 4, the valve will be rocked toward open position against the tension of the spring 21, while when the piston is moved in the opposite direction, the cam will be moved away from the roller 24 and the spring 21 be permitted to move the valve toward closed position.

The piston rod 27 has connection with a piston 29 which is positioned in a cylinder 30. One end of the cylinder 30 is open, as shown more clearly in Fig. 3, and toward the other end thereof connection is had through a suction pipe 31 with the intake pipe 12 at a point between the valve 16 and the intake manifold 13. A compression spring 32 is positioned between the piston 29 and an adjustable seat or abutment 33, the spring at 33 being adjustable relative to the adjacent end of the cylinder 30 by means of an adjusting screw 34, in order to vary the spring pressure on the piston 29. In order to prevent unauthorized adjustment of the spring 32, the adjusting screw 34 is provided with a serrated head 35 which is normally held against rotation by a set screw 36 that is threaded into the end of the cylinder 30 and is movable into engagement with the serrations in the head 35. Unauthorized removal of the set screw 36 and turning of the adjusting screw 34 is prevented by a seal 38 whose wire extends through the set screw 36 and a shoulder or lug 37 formed on the cylinder head.

The spring 32 normally urges the piston 29 and consequently the piston rod and the cam 26 into position to yieldably hold the valve 16 in open position. When the suction in the intake manifold and in the pipe 31 exceeds a predetermined degree, the piston 29 will be actuated from the position shown in Fig. 3 against the pressure of the spring 32, to thereby permit movement of the valve 16 toward closed position under tension of the spring 21, thus throttling the flow of fuel mixture to the motor. Obviously, with a certain degree of vacuum or suction there will be a certain degree of movement of the piston, with the result that the valve 16 will be turned for a predetermined distance toward closed position. The degree of vacuum necessary to effect movement of the piston and the extent of movement of the piston will, of course, be determined by the adjustment of the spring. The degree of suction is dependent upon the pumping action of the engine pistons and, hence, upon engine speed. Thus, with the valve 16 at any position the degree of suction will increase with increase in engine speed, and when the engine speed has reached a predetermined point, the piston 29 will be caused to retract and permit movement of the valve 16 toward closed position to produce a throttling action and thus prevent the engine running faster than the maximum governing speed, The cam 25 is so curved as to secure the proper proportional movement as between the valve 16 and the piston 29, to compensate for the fact that during compression of the spring, a constantly increasing degree of suction is required in order to produce a given range of movement of the piston. For this reason, the curvature of the cam is such that the rate of movement imparted to the cam roller 24, when the piston 29 is moved against the spring 32, is in its initial stage slower than when the piston is in its later stages of movement, whereby for a given change in degree of suction a proportional movement will be imparted to the valve 16.

The mechanism for rendering the governor ineffective to operate the throttle valve 16 for limited periods of time will now be described. To this end I provide a link 40 that is provided with a slot which has lost motion connection with a pin or stud 41 provided on the crank arm 20. Ordinarily, the crank arm is free to rock relative to the lever 40, but by shifting the link 40 downwardly, as hereinafter described, the crank arm will be moved or held down so as to maintain the valve 16 in open position with the cam roller 24 out of engagement with the cam 25, and hence not affected by movement of the piston 29 or the cam slide 26. The lower end of the link 40 is pivotally connected to a rocker arm 42 that is pivotally mounted at its other end to the casing 23, at the point 43. A spring 44 biases the lever 42 and the link 40 in a counter-clockwise direction, and thereby holds a cam follower 45 against a two-part disc 46—47 that is secured to a sleeve 48, that is loosely mounted on a sleeve-like clutch element 49 which is secured to a constantly-rotating shaft 50.

The shaft 50 has detachable connection at 51 with a flexible shaft 52 which may suitably be connected through speed reduction gears at 53 with the ordinary speedometer drive shaft 54. The speed reduction at 53 is such that the shaft 50 will be given only one revolution for perhaps two thousand feet of travel of the vehicle. A clutch element 55 is loosely and slidably mounted on the shaft 50 and is normally held in declutched position relative to the element 49 by a spring 56. The element 55 is constantly in telescopic engagement with the sleeve 48. A shifting fork 57 is employed to move the clutch element 55 into engagement with the element 49, and thereby cause the sleeve 48 and the cam discs 46—47 to rotate with the shaft 50. The clutch fork is manipulated from the driver's seat by moving the accelerator pedal 15 downwardly far enough to engage a pin 58 which through a bell crank lever 59 operates a pull rod or wire 60 that is in turn connected to the shifting fork 57.

The main throttle 14 can be held in sufficiently open position by the depression of the pedal 15 to a point at which it is not yet operative upon the pin 58. Further depression of the pedal 15 will throw into operation the clutch just above described, and rotation of the cam discs 46—47 will permit the cam follower 45 (Fig. 4) to drop off the high points in the cams and permit the lever 40 to be drawn in a counter-clockwise direction by the spring 44, thereby causing such lever to exert a pull that will move the arm 20 downwardly against the tension of the spring 21 and hold the cam roller 24 in raised position relative to the cam surfaces 25, with the valve 16 consequently open. In this position of the parts, movement of the piston 29 will have no effect upon the position of the valve 16.

The shifting of the clutch member 55 into operative position, as above described, for effecting a rotation of the cam discs, withdraws a pin 62 which is carried by the clutch element 55 from a hole in the cover plate 63 of the casing 23, so that if the clutch pedal 15 should be permitted to rise somewhat, such pin riding on the annular boss 64 of the plate 63 will maintain the clutch members in driving engagement. When the shaft 50 has completed a revolution, the pin 62 under the influence of the spring 56 will be sprung into the hole in the boss 64 by the spring 56, thereby automatically disengaging the clutch members, and also locking the cams 46—47 against idling movement. The spring 56 is of such stiffness that it also urges the pin 58 to its raised position, through the wire 60.

During rotation of the cams 46—47, the cam follower will rise from the low surfaces on the cam to the high points thereof. During this period of travel over the low cam surfaces, the valve 16 will be held in fully open position to permit of higher speed than that which is normally permitted by the governor mechanism above described. The duration of this temporary high speed period is determined by the adjustment of the cam discs 46 and 47 relative to one another. This relative adjustment of the cam discs 46—47 is effected by pin and slot arrangement indicated at 65 (Fig. 4), the screw pin being carried by one of the discs and extending through a slot in the other disc. The peripheral surfaces of the cams are of the same contour, and it will be seen that if one cam disc is rotatably adjusted relative to the other, that the high spot of the said cam will be engaged by the follower 45 at an earlier stage than when the cams are set with their raised portions in axial alignment with one another. As shown in Fig. 4, each cam disc has its depressed portion extending through about 120°, during which time the valve 16 would be permitted to remain open, but as shown in Fig. 4, one of the cams is rotatably offset relative to the other cam a distance of approximately 30°, so that the valve 16 will be held open thereby through only 90° of cam movement. It will be understood that when the cams have passed through the predetermined range of 90° or 120°, as above indicated, for example, the speed control piston and its associated parts will again be effective to hold the engine at a reduced speed.

Thus, the control apparatus could be put into operation by a single application, for a distance of 2,000 feet of vehicle travel, during which time the period of acceleration would be while the vehicle is traveling perhaps 500 feet, and during the balance of the time of rotation of this element the governor would be operative for normal speed control, and a second accelerating application could not be applied until after the said 2,000 feet of travel.

The period during which the valve 16 is held open independently of governor control is purposely made relatively short, but still long enough to permit a desired burst of speed. The longer high dwells on the cams insure that the operator cannot repeatedly actuate the control clutch with such rapidity as to maintain a substantially continuous ungoverned high speed, since he can effectively operate the control clutch only once during each revolution of the shaft 50, because the high portions of the cams return the valve 16 to the control of the governor independently of any action by the driver until a complete revolution of the shaft 50 has been had.

Referring to Fig. 7, when the lever 42 is actuated it closes a switch 66 and completes a circuit through an indicating lamp 67, showing the driver that the valve 16 has been released from the control of the governor, the circuit being automatically broken when the cam has again lifted the lever 42.

In Figs. 4 and 6 is shown means for automatically reducing the predetermined maximum governing speed whereby at night the vehicle cannot be driven so rapidly as in daylight. To this end, the pipe 31 is provided with a bleed port 68 controlled by a valve 69. A spring 70 tends to hold the valve 69 open. A solenoid 71 is provided for closing the valve 69 against the pressure of the spring 70. The circuit through the solenoid is controlled by the light switch 72, such circuit being closed when the lights are turned on. Upon completion of the circuit through the solenoid, the valve 69 will be closed, thus increasing the suction in the cylinder 30 and causing the valve 16 to be moved toward closed position at lower engine speeds than in the daytime.

Referring now to Fig. 9, I provide a motor 73 which may be either an electric motor or a vacuum motor, instead of the shaft 52, for driving the shaft 50a, which corresponds to the shaft 50 of the other figures. Suitable reduction gears 74 are provided between the motor and the shaft 50a, the motor 73 being constantly operated during movement of the vehicle, as in the case of shaft 52. The casing 23 is provided with the clutch apparatus as shown in Fig. 5, the clutch therein being operated by a pull rod 60a that corresponds to the pull rod 60 of Figs. 1 and 2.

In Figs. 10, 11 and 12, I show a governor of the centrifugal type which is employed instead of the vacuum control governor of Figs. 1 to 8. In this modified structure, a rod 80 and a cam 81 correspond in movement and function to the piston rod 27 and the cam member 26 of the other figures. Instead of shifting the rod 80 by a piston, it is provided with a yoke arm 82 that engages an annular groove in a sleeve 83 which is slidably mounted on shaft 84. Governor weights 85 are connected by links 86 to the sleeve 83 and by links 87 to a sleeve 88. The sleeves and links, of course, rotate with the shaft 84. A spring 90 tends to hold the governor in collapsed position. The shaft 84 is driven from a shaft 89 that has suitable connection with the transmission mechanism of the car. It will be understood that when the car reaches a predetermined rate of speed, the governor will be expanded under centrifugal force and will draw the sleeve 83 toward the left, thus withdrawing the cam 81 and permitting the valve 16 to be moved to closed position, as occurs in the showing of the other figures when the cam 26 is withdrawn.

The maximum speed at which the vehicle can travel is controlled by the governor, and adjustment of governor control is in turn effected by a compression spring 91 that is interposed between a suitable shoulder 92 on the casing and a nut 93 carried by the end of the rod 80.

In this structure, instead of driving the shaft 50 from the speedometer shaft, such shaft is driven from a countershaft 94 that is in turn driven through gear 95 and speed reducing gears 96 from the shaft 84. The operation is otherwise the same as in the structure of Figs. 1 to 8.

In Figs. 13, 14 and 15, I show a structure which is primarily intended to permit acceleration of a motor for a limited time above the normal maximum governed speed, but preventing "racing" of the motor during such limited period. However, the general arrangement shown in these figures could be also employed in substantially the same manner as the structures of the other figures, in that it can be arranged to prevent operation of the governor for a limited time at even extremely high engine speeds.

In this structure the throttle valve 101, its operating lever 102, spring 103, the cam 104, the piston 105, the cylinder 106, and the spring 107 correspond respectively to the parts 16, 18, 21, 26, 29, 30 and 32 of Figs. 1 to 8, and function in the same manner as such other parts. The valve 101 is normally held in open position against the tension of the spring 103 by pressure of the spring 107 acting against the piston 105. When suction in the intake line of the motor exceeds a predetermined degree, such suctional force acting through the conduit 108 will cause piston 105 to move to the left, and permit the spring 103 to move the valve 101 toward closed position. The setting of the spring 107 will, of course, determine the maximum speed at which the motor will normally be permitted to operate.

In order to permit temporary operation of the engine at higher speeds for short periods, but also limiting the engine speed to a point below its maximum or "racing" speed, I provide a control device contained within a casing 109. Within this casing is a shaft 110 driven from the speedometer shaft or some other portion of the mechanism as in the case of shaft 50. Relatively adjustable cam discs 111, 112 are rotated by the shaft 110 as are the cam discs 46 and 47, the cam discs being clutched and declutched from the shaft 110 in the same manner as the cam discs 46 and 47.

The cam 110—111 controls a switch arm 113 which is permitted to be moved to closed position under the influence of a spring 114 for a portion of a rotative cycle of the cam. The arm 113 carries a contact member that cooperates with a contact member 115 to complete a circuit through a solenoid 116. A pivotally-mounted armature 117 is actuated by the solenoid, and in turn operates a valve 118 that is normally held in a raised position by a spring 119. The valve 118 controls admission of atmospheric air to the conduit 108, and the entry of such air into the conduit will obviously reduce the suctional force in the cylinder 106. By so reducing the suctional force in the cylinder 106, the movement of the piston 105 toward the left will be reduced, so that so long as the switch at 115 is closed, and the valve 118 open, the engine speed can be increased to that normally permitted by the governor. The top speed of the engine is determined by the extent to which the valve 118 is open, and the range of opening movement of the valve is determined by the position of an adjustable stop screw 120.

Assuming, for example, that the valve 118 is in closed position and the setting of the spring is such that the governor will limit engine speed at the equivalent of 40 miles per hour, the cam 111—112 can be set in operation to permit of higher speeds for the period of time required for the low portions of the cam to move past the switch arm 113. The setting of the adjustable stop 120 can be such that the valve 118 will be actuated to a point at which the suctional force in the line 108 is reduced to such a degree that the piston 105 will not be actuated until the engine is operating at a desired greater number of revolutions per minute. When the limit of said additional speed is reached, the suctional force in the line 108 will be sufficient to cause operation of the governor to prevent further increase in engine speeds.

It will be understood that the stop screw 120 can be retracted to a point that there will not be sufficient suction in the cylinder 106 to have any effect whatever on the piston 105 during the time that the low point on the cam 111—112 permits it to remain closed, in which case, this structure will function substantially as do the structures of the other figures.

I claim as my invention:

1. The combination with an engine having an intake passage for the flow of motive fluid to the engine, and a governor operative to restrict flow of the motive fluid when the engine attains a predetermined speed, of control means for rendering the governor ineffective for a given period of time and for automatically rendering the governor operative after said period has elapsed.

2. The combination with an engine having an intake passage for the flow of motive fluid to the engine, and a governor operative to restrict flow of the motive fluid when the engine attains a predetermined speed, of control means for rendering the governor ineffective for a given period of time and for automatically rendering the governor operative after said period has elapsed, and means for preventing reoperation of said control means for another given period of time.

3. The combination with an engine having an intake passage for the flow of motive fluid to the engine, and a governor operative to restrict flow of the motive fluid when the engine attains a predetermined speed, of control means for rendering the governor ineffective for a given period of time and for automatically rendering the governor operative after said period has elapsed, and means for preventing reoperation of said control means for another given period of time which is greater than the first-named period.

4. The combination with an engine having an intake passage for the flow of motive fluid to the engine, said passage being controlled by a throttle valve, of a speed governor operable when the engine attains a predetermined speed to move said valve toward closed position, control means operable to move the valve toward open position and maintain it there for a given period of time independently of movements of the governor, and means for automatically rendering said control means inoperative after said given period of time.

5. The combination with a motor vehicle having an internal combustion engine, of a governor operative to restrict flow of motive fluid to the engine when the vehicle attains a predetermined speed, and control means for rendering the governor ineffective for a given period of time and for automatically rendering the governor operative after said period has elapsed.

6. The combination with a motor vehicle driven by an engine having an intake passage for the flow of motive fluid to the engine, and a governor operative to restrict flow of the motive fluid when the engine attains a predetermined speed, of control means for rendering the governor ineffective for a given distance of vehicle travel and for automatically rendering the governor operative after said distance has been traveled.

7. The combination with a motor vehicle driven by an engine having an intake passage for the flow of motive fluid to the engine, and a governor operative to restrict flow of the motive fluid when the engine attains a predetermined speed, of control means for rendering the governor ineffective for a given distance of vehicle travel and for automatically rendering the governor operative after said distance has been traveled, and means for preventing reoperation of said control means for another given distance of travel.

8. The combination with a motor vehicle driven by an engine having an intake passage for the flow of motive fluid to the engine, and a governor operative to restrict flow of the motive fluid when the engine attains a predetermined speed, of control means for rendering the governor ineffective for a given distance of vehicle travel and for automatically rendering the governor operative after said distance has been traveled, and means for preventing reoperation of said control means for another given distance of travel which is greater than the first-named distance.

9. The combination with a motor vehicle driven by an engine having an intake passage for the flow of motive fluid to the engine, said passage being controlled by a throttle valve, of a speed governor operable when the engine attains a predetermined speed to move said valve toward closed position, control means operable to move the valve toward open position and maintain it there for a given distance of vehicle travel, independently of movements of the governor, and means for automatically rendering said control means inoperative after said distance of travel.

10. The combination with a motor vehicle having an internal combustion engine, of a governor operative to restrict flow of motive fluid to the engine when the vehicle attains a predetermined speed, and control means for rendering the governor ineffective for a given distance of vehicle travel and for automatically rendering the governor operative after said distance has been traveled.

11. The combination with a motor and a governor operative to regulate the speed of said motor, of a control device for rendering the governor ineffective for a given period of time and for automatically rendering the governor operative after said period has elapsed.

12. The combination with a motor vehicle, of a governor operable to prevent the vehicle exceeding a predetermined rate of speed, a control device operable by the driver of the vehicle, for rendering the governor ineffective for a predetermined distance of travel, and automatically-operable means for rendering the governor again effective upon completion of said distance.

13. The combination with a motor vehicle, of a governor operable to prevent the vehicle exceeding a predetermined rate of speed, a control device operable by the driver of the vehicle to render the governor ineffective for a predetermined period of time, and means for preventing reactuation of said control means for another given period of time.

14. The combination with a motor vehicle having electric head lamps, of a governor operable to prevent the vehicle exceeding a predetermined rate of speed, and means actuated through closing of the head lamp circuit, for rendering said governor operable at a lower rate of vehicle speed.

15. The combination with a motor vehicle having an internal combustion engine, the supply of fuel to which is normally controlled by a manually operable accelerator member, of a governor operative to restrict flow of motive fluid to the engine when the vehicle attains a predetermined speed, and means actuated by movement of the accelerator member beyond its normal driving position, for rendering the governor ineffective for a given period of time.

16. The combination with a motor and a governor operative to normally limit the motor to a predetermined maximum speed, of a control device for rendering the governor ineffective at said speed, and means for automatically rendering the governor again operative after a given period of time.

17. The combination with a motor and a governor operative to normally limit the motor to a predetermined maximum speed, of a control device for rendering the governor ineffective at said speed and provided with automatically operable means for causing it to become again effective at a higher speed.

18. The combination with a motor and a governor operative to normally limit the motor to a predetermined maximum speed, of a control device for rendering the governor ineffective at said speed and causing it to become again effective at a higher speed, and means for automatically restoring the governor to its initial condition after a given period of time.

19. The combination with an internal combustion engine having an intake passageway for the flow of motive fluid to the engine under suctional force, of a throttle valve for controlling the supply of motive fluid, a cylinder communicating with the passageway, a piston in said cylinder movable in one direction under a predetermined suctional force in said passageway and cylinder, means for moving the said valve toward closed position when the piston is moved by said suctional force, means operable to relieve the said suctional force, and a device for automatically limiting the duration of effectiveness of the last-named means, to predetermined periods of time.

20. The combination with an internal combustion engine having an intake passageway for the flow of motive fluid to the engine under suctional force, of a throttle valve for controlling the supply of motive fluid, a cylinder communicating with the passageway, a piston in said cylinder movable in one direction under a predetermined suctional force in said passageway and cylinder, means for moving the said valve toward closed position when the piston is moved by said suctional force, means operable to admit atmospheric air to the said passageway, and a device for automatically limiting the duration of said admission of air to predetermined periods of time.

21. The combination with an internal combustion engine having an intake passageway for the flow of motive fluid to the engine under suctional force, of a throttle valve for controlling the supply of motive fluid, a cylinder communicating with the passageway, a piston in said cylinder movable in one direction under a predetermined suctional force in said passageway and cylinder, means for moving the said valve toward closed position when the piston is moved by said suctional force, means operable to relieve the said suctional force, to a predetermined maximum degree, which will permit of a faster engine speed under control of said piston, and a device for automatically limiting the duration of said relief of suctional force.

GEORGE E. HOWARD.